(12) United States Patent
Rana

(10) Patent No.: US 9,001,369 B1
(45) Date of Patent: Apr. 7, 2015

(54) PRINT JOB TRACKING AND POLICY ENFORCEMENT

(71) Applicant: Lexmark International, Inc., Lexington, KY (US)

(72) Inventor: Saugata Rana, Kolkata (IN)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/072,069

(22) Filed: Nov. 5, 2013

(30) Foreign Application Priority Data

Sep. 20, 2013 (IN) .......................... 2786/DEL/2013

(51) Int. Cl.
*G06F 15/00* (2006.01)
*H04N 1/00* (2006.01)
*H04N 1/32* (2006.01)

(52) U.S. Cl.
CPC ....... *H04N 1/00236* (2013.01); *H04N 1/32523* (2013.01); *H04N 1/32545* (2013.01); *H04N 2201/0082* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2006/0224749 A1 | 10/2006 | Bansal | |
| 2007/0214494 A1* | 9/2007 | Uruta et al. ...................... 726/2 |

\* cited by examiner

*Primary Examiner* — Saeid Ebrahimi Dehkordy

(57) ABSTRACT

Methods and apparatus enforce policy on print jobs and track them per users. A computing device has a layered service provider (LSP) and a spooler. The LSP determines whether data coining to it corresponds to print data or not. If so, it extracts user information and determines whether any imaging policies apply to the user. If policy applies, the LSP iteratively acknowledges to the spooler that data is being successfully transferred to an imaging device so the spooler will continue sending a remainder of the data corresponding to the print job. Upon receipt of an entire print job, the LSP enforces policy and notifies the user. It also notifies an accounting server to update its policies. Further embodiments note relationships between the LSP and spooler and their interaction with layers in a TCP/IP model.

17 Claims, 2 Drawing Sheets

PRINT JOB TRACKING AND POLICY ENFORCEMENT

FIELD OF THE INVENTION

The present invention relates to computing and imaging devices. More particularly, it relates to tracking print jobs of users and enforcing policies. Leveraging the functionality of a layered service provider typifies the embodiments.

BACKGROUND

In modern office environments, users send print jobs from computers, phones, tablets, etc. to print-release servers that hold them until users later pick them up at one of many networked imaging devices, e.g., printers, copiers, fax machines, etc. The servers not only hold print jobs until users authenticate themselves, but they track printing habits of users and enforce compliance of various policies of the office. The technique holds users accountable for their imaging projects, including size, cost, quotas, etc. Users are only made aware of enforcement of policy, however, at a time when they interact with the user interface of the imaging device, not when they send their print job. Managed print services (MPS) is but one popular form of print release implementation.

In traditional office environments, users send print jobs direct to imaging devices by way of a network port of a computer, altogether bypassing print servers. For such users, it is difficult, if not impossible, for organizations to track their printing habits and enforce policies. Many organizations, however, would still like a mechanism to bring users of this type under their control. Similarly, smaller organizations without servers would also like a mechanism to bring about policy control, but without incurring the costs associated with relatively expensive print-release infrastructure.

Complicating the introduction of solutions is that not all imaging devices of an organization are of a same type. Many of them have dissimilar makes and models, each with their own proprietary, dissimilar printer drivers. In turn, introducing a comprehensive policy-enforcement solution in a fleet of such imaging devices is more complex than merely updating/patching existing printer drivers. It is insufficient to simply customize software code to implement common policies on dissimilar hardware devices with dissimilar software.

On the other hand, even if all the imaging devices were of a same make and model, updating/patching drivers becomes a tedious practice for IT departments. Not only must imaging policy be configured in software, the software must be installed on each and every driver per every computing device, or pushed to individual computers from a central location. The software must also contemplate nuances in drivers having differing existing patches and differing versions (older/younger) in comparison to other drivers. It is especially difficult to know these details when sometimes it is not possible to centrally know which computers have which driver versions installed thereon.

What is needed is a solution to enforce policy on users who print direct to imaging devices. The need extends to a generic solution in environments in which fleets of imaging devices are potentially dissimilar, including their printer drivers. Any solution should contemplate a contemporaneous notification to users if policy is being enforced against a current print job of their sending. Additional benefits and alternatives are also sought when devising solutions.

SUMMARY

The above-mentioned and other problems are solved by methods and apparatus that enforce policy on print jobs sent to an imaging device and track them per users. A computing device connected to the imaging has a layered service provider (LSP) and a spooler. The LSP determines whether data coming to it corresponds to print data or not. If so, it extracts user information regarding the print job and determines whether any imaging policies apply to the user, such as limits on numbers of printed pages, size, color, or the like. If policy applies, the LSP iteratively acknowledges to the spooler that data is being successfully transferred to the imaging device so the spooler will continue sending a remainder of the data corresponding to the print job. Upon receipt of an entirety of the print job, the LSP enforces policy and notifies the user. Typical enforcement includes stopping printing or allowing printing with a warning to the user. The LSP also notifies an accounting server to update its policies per the user and the enforcement against the recent print job.

In the event the LSP does not find a print job in data coming to it, the LSP passes the data direct to other LSPs, if any, and to lower layers in the internet protocol suite, commonly referenced as the TCP/IP model. In the event no policies require enforcement on the current print job, the LSP passes the print data direct to the imaging device for printing. It also notifies the accounting server with metadata to update its policies. Further embodiments note relationships between the LSP and spooler and their interaction with layers in the TCP/IP model.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach policy enforcement on print jobs sent to an imaging device and track them per users.

Figure 1:
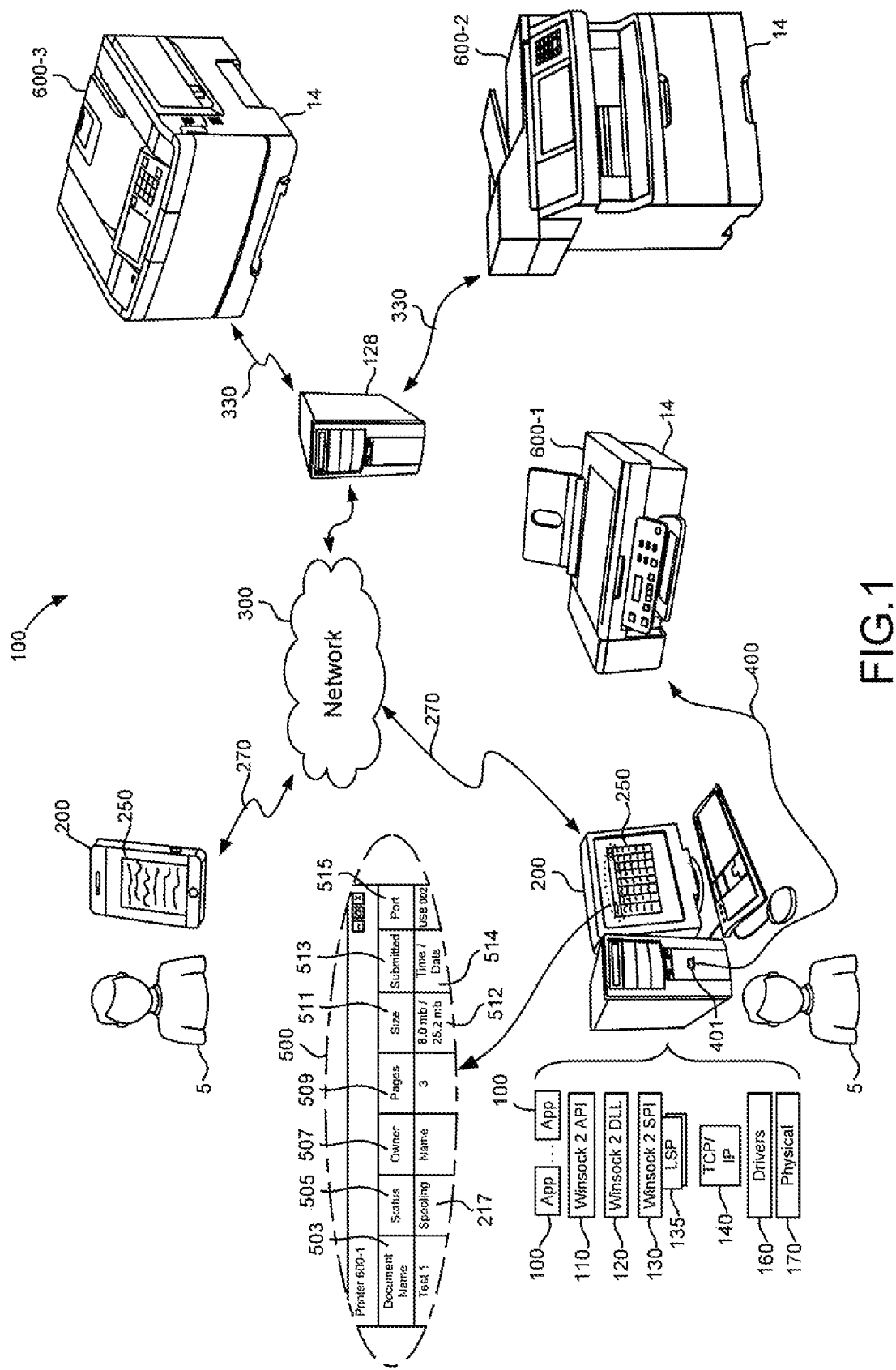
FIG. 1 is a diagrammatic view of a computing environment for print job tracking and policy enforcement.

With reference to FIG. 1, a computing environment 100 includes computing devices 200 such as smart phones, laptops, desktops, tablets, etc. and imaging devices 600 such as printers, copiers, fax machines, etc. Users 5 interact with their devices 200 to engage items 250 such as documents, images, web pages, screen shots, messages, files, photos, etc. They request printing of the items by sending a "print job" direct 400 from a network port 401 to a connected imaging device 600-1 or indirect 270 by way of a print server 128 and attendant computing network 300. As they print, a user interface messaging panel 500 is available to provide metrics about a current print job and any other print jobs in a queue, as is typical. These include, but are not limited to, the name of the document 503, its status 505 spooling/printing, the owner of the print job 507, a number of pages 509, a size of the print job 511 in both an amount of the print job being sent presently to the imaging device 512/a total amount of the print job sent to the imaging device 514, the time and date the job was submitted 513, and through which port the job was sent 515. The print job is generated by an application 100 of the computing device and formatted in a manner for controllers in the various devices to speak to one another in a same page description language, such as Printer Command Language (PCL), Postscript (PS), etc. In the network, the server forwards 330 the print job to a specific imaging device so users can claim a hard copy output at any of a variety of imaging devices 600-2, 600-3 of their choosing. The network includes or not a variety of software to send and receive packets of information between devices and physical hardware to move the packets, such as routers, servers, switches, desktop/laptop computers, phone transmission towers, relay towers, satellites, fiber optics, phone lines, cables, etc. The connections are wired or wireless between a few or many such devices in an internet, intranet or other environment.

In a Transmission Control Protocol (TCP)/Internet Protocol (IP) reference model on the computing devices 200, the applications 100 reside in an uppermost or highest layer. The applications are any of a variety but contemplate web browsers, word processors, email clients, games, etc. that users install on the operating system of the computer. Users interact with the applications by way of a display screen, pointing device, screen gesture, etc. and the applications communicate downward in the computer to lower layers of the TCP/IP model, as is known.

In sequence, the applications communicate downward with an Applications Programming Interface (API), especially Microsoft's Winsock 2 Application Programming Interface 110, for example, along with Winsock 2 Dynamic Linked Libraries (DLL) 120. This communicates downward to a lower layer, including a Winsock 2 Service Provider Interface (SPI) 130. The SPI includes one or more Layered Service Providers (LSPs) 135.

As LSPs are relatively modern, they are known generally as DLLs that use Winsock APIs to insert themselves into the protocol stack above lower transport and internet layers, such as TCP/IP 140. The LSPs intercept and optionally modify inbound and outbound traffic between the internet/network 300 and applications 100. Particularly, LSPs work by intercepting Winsock 2 commands before they are processed by ws2_32.dll and can therefore modify commands, drop commands, or log data which makes them useful for filtering and "sniffing" data. As will be seen below, however, the LSP(s) of the present disclosure are configured specially to intercept traffic between a spooler of the computing device and imaging devices 600. They monitor traffic in a fashion similar to the way Winsock 2 monitors internet traffic, but here intercept data traffic between a network port 401 of the computing device and a connected imaging device, especially (but not necessarily) an imaging device 600-1 directly connected by way of a tether (cable) 400. However, in situations when data coming to the LSP from upper layers does not constitute print or imaging data, the LSP is configured to merely act as a conduit in the protocol stack and lets advance data to the TCP/IP stack. Appreciating that many LSPs come pre-configured with operating systems installed on computing devices, such as Microsoft's Windows 7, further features of the invention include configuring existing LSPs to provide the foregoing and other services. Configuration can come by way of updates or patches sent to the computing device 200 over the network 300 or by way of computer readable media, not shown, such as disks or USB sticks that get inserted into the computers and install executable instructions. Configuration can also come by way of drivers 160 for the various imaging devices 600 that get installed and updated on the computing device. Beneath that, the physical layer 170 concerns itself with the transmission/reception of communications over the physical medium, as is typical.

Figure 2:
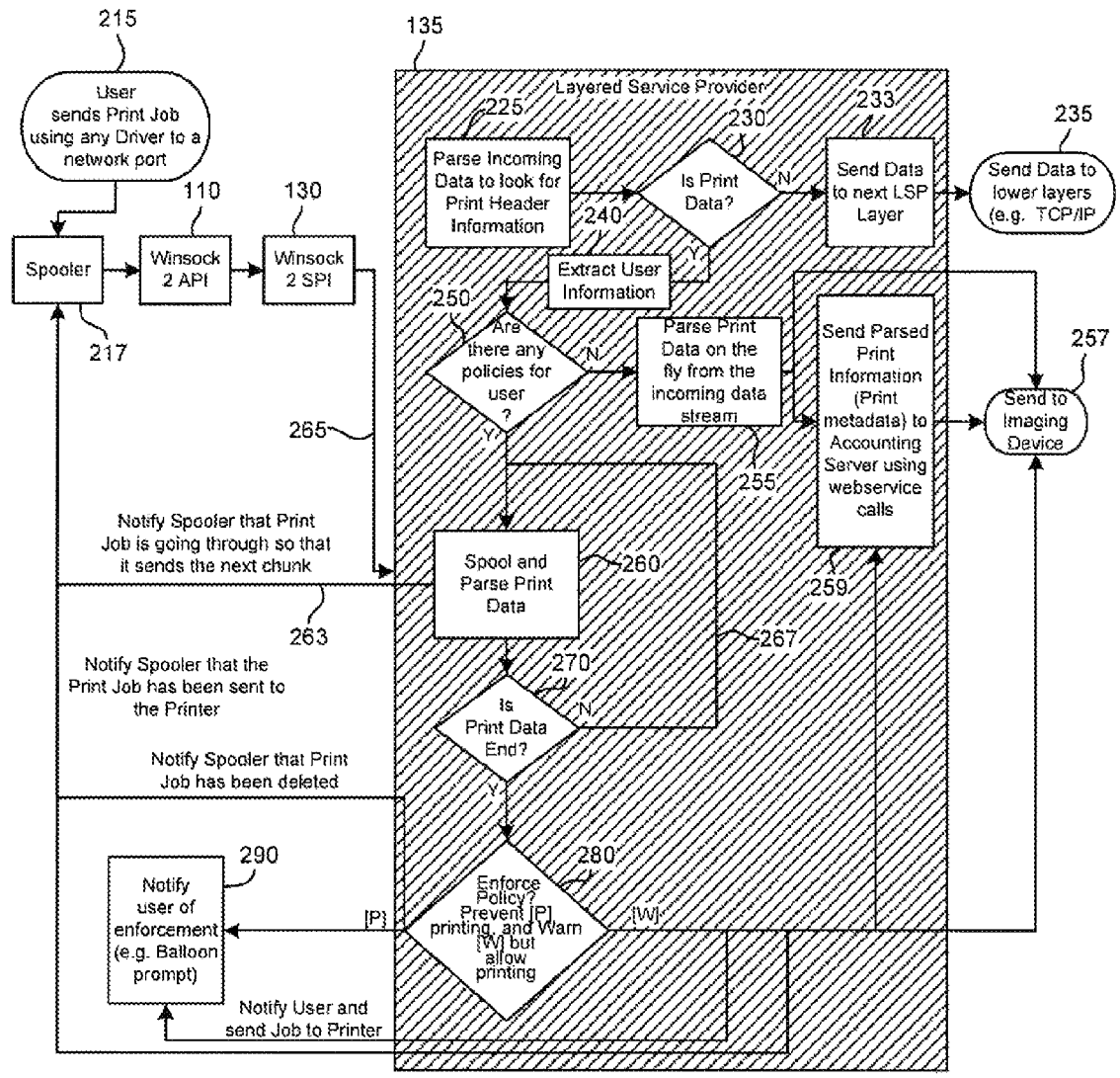
FIG. 2 is a flow chart of a representative embodiment for tracking and enforcement.

With reference to FIG. 2, users initiate a print job from their computing device, 215. They send it to an imaging device through a network port. The print job is seen through any driver pointing to an IP port of an imaging device, thus making the technique here independent of any brand, make or model of printers. The print job is generally lengthy and typically spooled by a spooler 217 in the computing device so that the computing device can undertake other tasks while the print job gets printed. The spooler regularly communicates data of the print job to the imaging device in "chunks" or portions, often in sizes of about 4 MB at a time until an entire print job is sent. In order for the spooler to continue sending second, third or more chunks after sending a first, initial chunk, the spooler requires acknowledgement back that data is being sent successfully to the imaging device. In this regard, the LSP is used to acknowledge back to the spooler that data is indeed being sent successfully, as seen below.

Meanwhile, the LSP 135 intercepts all data traffic between applications and the interact/network, as well as data from the network port headed to imaging devices. As such, data received by the LSP is sniffed or parsed at 225 to determine whether it is data corresponding to a print job. The LSP receives the data through the overlapped Send API call and parses its job header to see if it corresponds to print header information. In Printer Job Languages (PJL), of which Postscript (PS) and Printer Command Language (PCL) language are common, print jobs include start makers in the form of: {Esc} %-12345X. In hexadecimal form, the start marker appears as: 0x1B, 0x25, 0x2D, 0x31, 0x32, 0x33, 0x34, 0x35, 0x58. Upon detection, the LSP concludes or not if data received at the LSP is print data of a print job, 230. If the data is not print data, the LSP 135 simply delegates the call to the next LSP layer 233, if any, and thence to lowers layers of the OSI model 235, such as TCP/IP layers in the Transport and Network layers. Once there, the data is monitored inbound and outbound for other applications in the computing device, as is typical.

On the other hand, if the LSP concludes the data received at the LSP is indeed data of a print job at 230, it next extracts user information from the data, 240. In PS and PCL languages, the print job start marker is followed by information such as owner name (507, FIG. 1) and document name (503, FIG. 1). Once the name of user of the print job is known to an entity, policy limitations can be enforced on the print job, despite the print job having been sent through a network port direct to an imaging device. At 250, the LSP determines whether the owner of the print job has any policies that need applying to the current print job. Policies can take any form an entity wishes to impose on the user and the following are representative, such as being able to only print a limited number of pages per print job, per month, etc., being allowed to print only in monochrome toner, not color, not being allowed to print at all, or the like. The LSP determines this by examining local cached policies or by making calls through the network (300, FIG. 1) to a server (e.g., 128) and conducting an LDAP lookup, for instance.

In either situation, if no policies exist that require applying to the current print job, the LSP parses the data coming to it on-the-fly without data again being spooled by the computing device. Rather, the data coming to the LSP for printing is not accumulated and sent the imaging device for rasterizing and printing, 257. The metadata of the print job is also sent to an accounting server (e.g., 120, FIG. 1) through a webservice call, for instance, so that policies can be updated per the user. 259. As an example, if a user is only permitted to print 20 pages of color printing per month, and so far the user has printed 10 pages and the current print job consists of 10 pages of color printing, the user is permitted to print this time, but not a next color print job as the user will have reached their quota of 20 color pages per month. Thence, the current print job should be allowed to proceed, but not the next. The accounting server is updated to reflect this change in policy. The LSP will take notice of this during a next instance of a user sending a color print job and the LSP, again, inquiring about policies at 250.

Alternatively, if policies do exist for the user at 250, then an entirety of the data of the print job coming to LSP is spooled in the computing device before sending to the imaging device for printing, 260. This is necessary since certain policies may or may not require enforcing until an entirety of metadata of a print job is known. For example, if a user is permitted to print 1000 pages per month, and has already printed 995, it is necessary to know whether the current print job has five or fewer pages, thence allowing printing to proceed, or whether it exceeds five pages, thence stopping printing entirely. It may be also possible to allow printing for the first five pages and thereafter truncating printing, but such has yet to be confirmed in practice.

As the data of the print job is being spooled, the spooler 217 expects some sort of feedback that data is actually being sent successfully to the imaging device. By setting the number of bytes in the LSP to what was actually received from the spooler, e.g., 4 MB "chunk," the spooler is spoofed into believing the print job is proceeding to the imaging device as is normal. This iteratively continues 263, 265, 260, and 267 until there is no further data of the print job at 270 coming from the spooler 217. As the last portion of data from the spooler may not correspond exactly to the "chunk" size earlier selected, e.g., 4 MB, the LSP notifies the spooler of receipt of the final or last chunk of data from the spooler by notifying the spooler of the exact size of the last chunk. This continues until there is no further data from the spooler, thus signaling the end of the print data. The LSP recognizes this in code as pages in print jobs have end page markers, as well as begin page markers. They are denoted in PCL-XL as: begin page marker 0xF8, 0x25, 0x43; and end page marker 0xF8, 0x31, 0x44. For other printing languages there are other unique byte sequences that are known.

At 280, once the LSP has received the entirety of the print job, the policy per the user is enforced upon the current print job at 280. To the extent the policy dictates that no printing can occur for the user, printing is prevented [P] and the user is notified at their computing device at 290 without the user needing to interface directly with the imaging device. The notice takes the form of a "balloon prompt" for instance, or other. The LSP also notifies the spooler 217 that the print job has been deleted. Conversely, the policy may not require any enforcement, but a preemptive notice or warning [W] can be sent to the user at 290, but also having the print job proceed to printing at the imaging device, 257. Metadata is also sent to one or more servers at 259 to update policies against the user.

Relative advantages of the many embodiments should now be apparent to those skilled in the art. By implementing a layered service provider that tracks print jobs and enforces policies, especially when users print jobs through a network port direct to an imaging device, specific advantages include but are not limited to:

I. For Users
1. Immediate notification of enforcement of policy at the computing device sending the print job instead of delayed notification when users seek to retrieve their print job and obtain messaging at the display panel of the imaging device; and
2. No visible impact during printing for those print jobs not having any applied imaging policies.

II. For System Administrators:
1. Policy enforcement occurs upon configuration of the LSP independent of any printer driver or print monitor change whereas prior art approaches having a language monitor or driver-based implementation included a step of configuration which needed to be run executed after every driver installation or maybe after every port change;
2. There are no customized solutions required for Windows 7 as may be required for a language monitor based solution; and
3. There are no customized solutions required of a printer driver or language monitor or requiring a print monitor or a virtual print monitor; and III. For Solutions Provider:
1. Tracking of print jobs and enforcement of policy now occurs independent of types of imaging device and their proprietary print drivers and without any special installation or configuration; and
2. Tracking of print jobs and enforcement of policy now occurs in a fleet of diversified imaging devices, each with differing hardware and software, and still accounts for and enforces policy on all print jobs.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. In a computing device configured to send print jobs to an imaging device, a method of installing imaging policy on the computing device regardless of a type of the imaging device, comprising:

configuring a layered service provider of the computing device to determine whether data coming to the layered service provider includes print header information;

if the data includes said print header information, configuring the layered service provider to extract information of a user sending from the computing device to the imaging device;

if imaging policies exist for the user sending data from the computing device to the imaging device, configuring the layered service provider to cause a spooler of the computing device to spool an entirety of the data of a current print job coming to the spooler without sending any of the data of the current print job to the imaging device; and configuring the layered service provider to iteratively acknowledge to the spooler of the computing device that data of the current print job coming to the layered service provider is being successfully sent to the imaging device for printing when in fact the data of the current print job is not being sent to the imaging device thereby spoofing the spooler of the computing device.

2. The method of claim 1, further including configuring the layered service provider to communicate with an accounting server to update imaging policies for users as the users send print jobs from the computing device to the imaging device.

3. The method of claim 2, further including configuring the layered service provider to communicate with the accounting server to send a size of the current print job, a number of pages of the current print job, and whether the current print job includes color printing.

4. The method of claim 1, further including configuring the layered service provider to retrieve the imaging policies corresponding to the users.

5. The method of claim 1, further including configuring the layered service provider to let pass the data to lower layers if the data does not include print header information.

6. The method of claim 1, further including configuring the layered service provider to determine an end page marker in the data coming to the layered service provider if the data is determined to include print header information.

7. The method of claim 1, further including installing the layered service provider on the computing device.

8. The method of claim 7, further including installing the layered service provider in a service provider interface layer.

9. The method of claim 1, further including configuring the layered service provider to enforce said imaging polices against the current print job.

10. The method of claim 9, further including enforcing the imaging policies by preventing printing of the current print job at the imaging device or allowing printing of the current print job at the imaging device including a user warning on the computing device.

11. The method of claim 1, further including configuring the spooler to communicate with the layered service provider and other lower layers of the TCP/IP model.

12. The method of claim 1, further including determining whether the user sent a print job to a network port of the computing device using any printer driver.

13. A method for enforcing imaging policy on users sending print jobs direct from a network port of a computing device to an imaging device, comprising:
configuring a layered service provider of the computing device;
determining whether data coining to the layered service provider corresponds to a print job from the computing device to the imaging device;
if so, determining a user who sent the print job from the computing device to the imaging device;
determining whether any imaging policies correspond to the user that require applying to the print job; and
if so, causing a spooler of the computing device to spool an entirety of the data of the print job coming to the spooler without sending any of the data of the print job to the imaging device and during spooling repeatedly acknowledging from the layered service provide to the spooler of the computing device that data is being successfully transferred to the imaging device when in fact the data of the print job is not being sent to the imaging device so the spooler will be spoofed into believing the spooler is sending the data to the imaging device and will continue sending a remainder of the data corresponding to the print job.

14. The method of claim 13, further including directly sending the data from the computing device to the imaging device if it is determined that no imaging policies apply.

15. The method of claim 13, further including notifying a user at the computing device of any enforcement of policy against the print job.

16. The method of claim 13, further including accumulating metadata on the print job and updating the imaging policies for the user.

17. The method of claim 13, if data coming to the layered service provider does not correspond to the print job from the computing device to the imaging device, further including passing directly the data through the layered service provider to lower layers.

* * * * *